United States Patent
North et al.

(10) Patent No.: US 9,116,830 B2
(45) Date of Patent: Aug. 25, 2015

(54) METHOD TO EXTEND DATA RETENTION FOR FLASH BASED STORAGE IN A REAL TIME DEVICE PROCESSED ON GENERIC SEMICONDUCTOR TECHNOLOGY

(75) Inventors: Gregory A. North, Austin, TX (US); Thomas A. Fedorko, Buda, TX (US); Thomas Hegedus, Round Rock, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 539 days.

(21) Appl. No.: 12/770,326

(22) Filed: Apr. 29, 2010

(65) Prior Publication Data

US 2014/0143632 A1 May 22, 2014

Related U.S. Application Data

(60) Provisional application No. 61/173,692, filed on Apr. 29, 2009.

(51) Int. Cl.
G06F 11/08 (2006.01)
G06F 11/10 (2006.01)

(52) U.S. Cl.
CPC ........ *G06F 11/1048* (2013.01); *G06F 11/1068* (2013.01); *G06F 11/1004* (2013.01); *G06F 11/1008* (2013.01)

(58) Field of Classification Search
CPC ............ G06F 11/1008; G06F 11/1004; G06F 11/1068; G06F 11/108; G06F 11/1076
USPC .......... 714/773, 763, 752, 746, 754; 365/185.25, 185.29, 185.33, 185.09
See application file for complete search history.

(56) References Cited

U.S. PATENT DOCUMENTS

| | | | |
|---|---|---|---|
| 7,012,835 B2* | 3/2006 | Gonzalez et al. | 365/185.11 |
| 8,169,825 B1* | 5/2012 | Shalvi et al. | 365/185.09 |
| 2007/0300130 A1* | 12/2007 | Gorobets | 714/766 |
| 2008/0082845 A1* | 4/2008 | Morisawa | 713/323 |
| 2008/0098165 A1* | 4/2008 | Shinozaki et al. | 711/103 |
| 2008/0109705 A1* | 5/2008 | Pawlowski et al. | 714/767 |
| 2010/0165714 A1* | 7/2010 | Wu et al. | 365/163 |
| 2010/0205504 A1* | 8/2010 | Fung et al. | 714/752 |

* cited by examiner

*Primary Examiner* — Albert Decady
*Assistant Examiner* — Christian Dorman
(74) *Attorney, Agent, or Firm* — Robert D. Marshall, Jr.; Frank D. Cimino

(57) ABSTRACT

This invention is a method to extend data retention for FLASH based storage in a real time device embodied in generic semiconductor technology. This invention provides a manner to re-energize the Flash memory array to improve the retention characteristics of the memory without altering the clock cycle determinism of the system. Under certain conditions the Flash memory bit cells will lose their charge/non-charge over time. In this particular FLASH technology, an ECC is used to correct single bit errors within a 32 bit word. If there is time before multiple errors occur within a word, the single error cases are identified and "ReFlashed" to bring the value of the cell back to its "newly" programmed levels. This dramatically improves the long term retention characteristics of the memory while requiring some control logic and an area of non-volatile scratch/status information.

12 Claims, 3 Drawing Sheets

US 9,116,830 B2

METHOD TO EXTEND DATA RETENTION FOR FLASH BASED STORAGE IN A REAL TIME DEVICE PROCESSED ON GENERIC SEMICONDUCTOR TECHNOLOGY

CLAIMS OF PRIORITY

This application claims priority under 35 U.S.C. 119(e)(1) to U.S. Provisional Application No. 61/173,692 filed Apr. 29, 2009.

TECHNICAL FIELD OF THE INVENTION

The technical field of this invention is memory technology and more specifically FLASH memory technology.

BACKGROUND OF THE INVENTION

This invention an enhances features of an existing FLASH memory, for example the MoSys 1-T eFlash 1 Mbit macro. As known in the art a macro is a design of a complete system or sub-system that can be incorporated into a larger design such as a system on a chip (SOC). A brief description of the key characteristics of the macro implementation and other requirements follows.

FIG. 1 illustrates a prior art FLASH macro 100. The FLASH macro 100 includes a write controller 120, a charge pump 125 and 4 by 32 Kbyte FLASH array blocks 131 to 134. A small amount of the FLASH array is used as configuration data for the device. This is known as ID space and is separate from the user accessible space. FLASH macro 100 requires charge pump 125 to produce voltage higher than a typical power supply voltage needed for write and erase operations. FLASH array blocks 131 to 134 are divided into 16 high voltage banks of 32 rows each containing 16 by 32-bit words in this example. A write operation is performed on a single row. An erase operation is performed concurrently on 8 rows. Each of the 4 FLASH blocks 131 to 134 includes a corresponding sense-amplifier structure 135 to 138 for reads. Sense-amplifier structures 135 to 138 are connected write controller 120 permitting verification that programmed values are fully written. Each of the 4 FLASH blocks 131 to 134 has a corresponding error correction code circuit 141, 142, 143 and 144. Data stored in FLASH macro 100 may be accessed by bus 110.

SUMMARY OF THE INVENTION

This invention is a method to extend data retention for FLASH based storage in a real time device embodied in generic semiconductor technology. This invention provides a manner to re-energize the Flash memory array to improve the retention characteristics of the memory without altering the clock cycle determinism of the system. Under certain conditions the Flash memory bit cells will lose their charge/non-charge over time. In this particular FLASH technology, an ECC is used to correct single bit errors within a 32 bit word. If there is time before multiple errors occur within a word, the single error cases are identified and "ReFlashed" to bring the value of the cell back to its "newly" programmed levels. This dramatically improves the long term retention characteristics of the memory while requiring some control logic and an area of non-volatile scratch/status information.

BRIEF DESCRIPTION OF THE DRAWINGS

These and other aspects of this invention are illustrated in the drawings, in which.

DETAILED DESCRIPTION OF PREFERRED EMBODIMENTS

This invention is a method to extend data retention for FLASH based storage in a real time device embodied in generic semiconductor technology. This application describes numerous specific details in order to provide a thorough understanding of the present invention. One skilled in the art will appreciate that one may practice the present invention without these specific details. Additionally, this disclosure does not describe in detail some well known items in order not to obscure the present invention.

Figure 2:
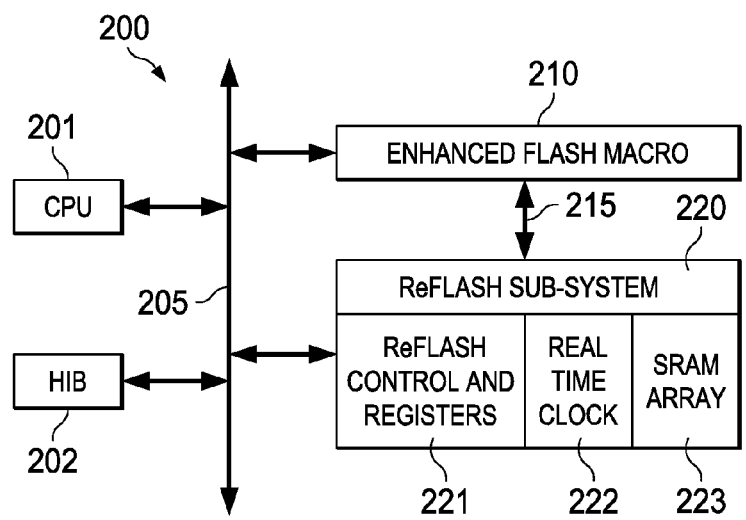
FIG. 2 illustrates a block diagram of a real time system using this invention.

FIG. 2 is a block diagram of a real time system 200 using this invention. Real time system 200 includes central processing unit (CPU) 201, hibernate module 201, enhanced FLASH module 210 and reFLASH sub-system 220 interconnected by system bus 205. Central processing unit (CPU) 201 provides the system intelligence. To this end CPU 201 uses instructions and/or data stored in enhanced FLASH macro 210. HIB module 202 operates to control power consumption in real time system 200. The most important aspect of HIB module 202 for this invention is control of power supplied to enhanced FLASH macro 210. In this example HIB module 202 may remove electric power from enhanced FLASH macro 210 at any time.

Figure 1:
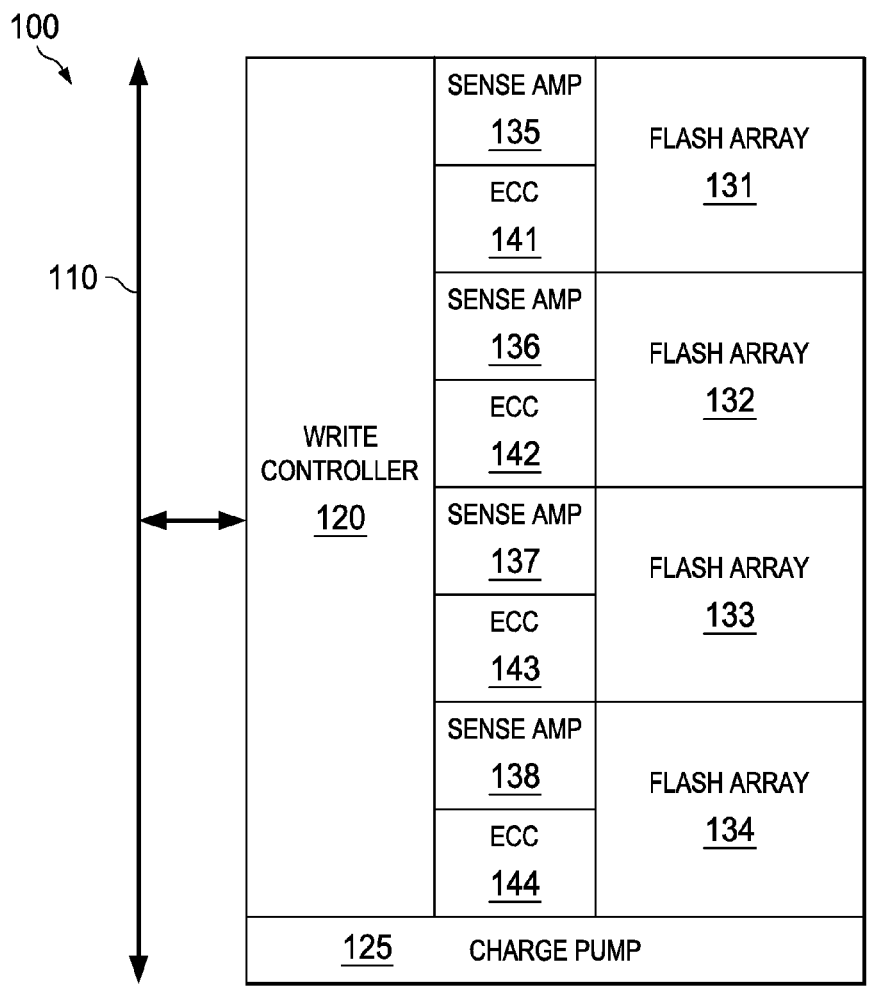
FIG. 1 illustrates a prior art FLASH macro to which this invention is applicable.

Enhanced FLASH macro 210 is similar to FLASH macro 100 illustrated in FIG. 1 with one major difference. Enhanced FLASH macro 210 includes a second data port connected via bus 215 to reFLASH sub-system 220. The use of this second port will be described below.

ReFLASH sub-system 220 includes reFLASH control and registers 221, real time clock 222 and static random access memory (SAM) (SRAM) 223. ReFLASH control and registers 221.

The prior art example FLASH macro 100 has a single read/program (R/Prog) port connected to bus 110. This invention requires modification to include a separate read port connected to system bus 205 and program/erase (Prog/Erase) port connected to bus 215. This invention has restriction on port concurrency so that a block 131 to 134 currently in a Prog/Erase operation cannot be accessed for Reads. The other three blocks 131 to 134 are available for Reads as normal. This restriction requires system bus 205 used for read and write verification from sense-amp structures 135 to 138 to be split into two, one for Read and one for Prog. In FLASH macro 100 illustrated in FIG. 1 an erase operation doesn't use a verification step so it will not need intermediate results transferred from the block to a common decision point.

This invention includes some privately addressable rows outside of the user rows that can be used as non-volatile memory scratch area and status flags. Such private areas (PVTMEM) must be outside of the Main Array MERASE. This can be handled as an extension of the ID space but in a separate high voltage (HV) sector than the ID. Such a PVTMEM may be embodied in enhanced FLASH macro 210 or in ReFLASH sub-system 220. In particular such PVTMEM may be a part of reFLASH control and registers 221.

This invention can employ an option of a single ROW erase permitting a smaller ERASE resolution to fix a single word. This invention permits a one quarter BANK ERASE and a single ROW (PAGE) ERASE.

The error correction code (ECC) equations used by the FLASH needs to be known by reFlash sub-system 220 to determine the correct ECC bit values or an equivalent manner for determining the correct values is needed.

This invention permits removal of power during a PROG/ERASE operation without invalidating content outside of the PAGEs being processed. Removal of power while "pumping" a line with its same contents cannot invalidate content on that line.

This invention includes 32 Kbyte static random access memory (SRAM) 223 for storing the USER contents of a block being ReFlashed. SRAM 223 will be accessed for all Reads to the target block. A write to the targeted block will be described later. It is enough for this portion of the description to state that the shadow memory (SRAM 223) is write-through upon writes to the target block.

This invention does not require an exact real time. A modest real time clock 222 is necessary to determine how much time has passed since the last ReFlash of a block. Real time clock 222 is based upon a 16 MHz precision internal oscillator (PIOSC) in this example. Real time clock 222 provides the required durations by dividing down the 16 MHz PIOSC to a manageable period.

This invention is adapted to work in a real time system that uses a HIB module 202 to control enhanced FLASH macro 210 power. Such a HIB module 202 may aggressively control power supplied to enhanced FLASH macro 202 to minimize system power consumption. Such a HIB module 202 removes power from the enhanced FLASH macro 210 during periods of expected nonuse. This invention includes some dedicated registers to store the time since the last ReFlash information. This allows the period for this information to be stored in non-volatile memory to be much longer thus saving endurance cycles.

This invention preferably includes some special controls that the USER program can access if necessary. For example a system where an external controller provides a periodic Hibernate like function by asynchronously pulling power completely from the device needs some handshake to the external controller to receive a shutdown command and indicate when shutdown is complete. This kind of handshake is only necessary where a high rate continual asynchronous removal of power occurs.

The goal is to periodically check the FLASH for single error corrections (SEC) and ReFlash those words that have had a bit failure. The period of ReFlash will be determined through characterization and will be programmed in the device configuration data REGIB preferably within reFLASH control and registers 221. This period is preferably in the range 24 hours. It is necessary to ReFlash based on time as well as based on SEC to prevent a stuck bit from continually being ReFlashed and causing other disturb issues. There are two directions for disturb. In the first direction a programmed 0 bit changes to a 1 bit (0 to 1 error). This is typically caused by charge loss on a programmed cell. In the second direction a programmed 1 bit changes to a 0 bit (1 to 0 error). This is disturb within an HV sector due to accumulated PROG operation on a bit line. Operations that fix the 0 to 1 error will create the 1 to 0 error over time if enough corrections are performed.

To fix a 0 to 1 error, the page does not have to be ERASED. Thus the contents of the page do not have to be temporarily saved in non-volatile memory (NVM). A ReFlash creates a condition where the prior art MoSys Intelligent Programming Algorithm will "repump" a 0 value to be stronger. By only "repumping" the cells that need it and doing this on a time period, the endurance and disturb counts are kept to a minimum.

When a 1 to 0 error has been detected and is determined not a bit leakage root cause (see below for a description of error determination), the PAGE (16 words) will need to be copied to a scratch NVM storage area and the errant page ERASED and then reprogrammed. This is the only way to restore a '1' value to the bit. This asymmetry is caused by the semiconductor processes in making FLASH memories. These should be infrequent failures compared to the 0 to 1 failure since it takes thousands of PROG operations to disturb the ERASED state.

There are several components of the invention and various system usage models that need to be handled. The descriptions below are for an example implementation but the same principal can be applied to other platforms. This list highlights the main elements that must occur or be allowed. The invention captures the current contents of targeted 32 Kbyte Flash block to be ReFlashed. The invention maintains non-volatile record of the time duration since the last reFLASH. The invention maintains coherent non-volatile USER data while ReFlash operation is performed. The invention ensures that every system read of Flash must occur with the same timing as when ReFlash not active. PROG/ERASE operations may take longer with this invention than when ReFlash is not active. Entry into HIB may be delayed in this invention by up to 20 msec when ReFlash is active.

Enhanced FLASH macro 210 of this example has two 1 Mbit Flash macros that are program interleaved on a word basis. Each macro has a 512 byte ID block used for part configuration. Only the instance 0 ID block is currently used. This example circuit also includes a pre-fetch buffer that is used when operating at a frequency greater than 50 MHz.

This description will use an example ReFlash period of 24 hours. This means that each 32 Kbyte macro block will be ReFlashed within 24 hours of FLASH powered uptime. Time while the FLASH memory is not powered is not considered.

ReFLASH sub-system 220 of this example includes a dedicated 32 Kbyte SRAM for ReFlash that stores the contents of the targeted FLASH memory block in the background of when CPU 201 is running. Since there is only one Read port on the FLASH macro this storage of the data in the targeted FLASH memory block is done by stealing cycles when CPU 201 is not accessing the FLASH. With the addition of a one word buffer, which takes care of the BR, CPU 201 cannot keep a single macro busy 100% of the time indefinitely. Since the FLASH memory circuit generally operates on a clock 180 degrees out of phase of CPU 201, the first half of the address (ADDR) cycle is used to determine whether CPU 201 is accessing the target macro. If it is not, this FLASH cycle can be used to read the next word required by SRAM 223.

There are several cases dependent upon the type of access to the FLASH memory circuit. If the access is to linear code, every other cycle is available to fill SRAM 223 since the memory is interleaved. If the access is BR or the equivalent, this will read from the one word buffer. A pathological worse case access is a hand coded loop with even step literal accesses to FLASH running from SRAM at more than 50 MHz. Another pathological case involves an ultra-slow clock. The FLASH memory circuit of this example has a minimum clock frequency of 30 KHz/64 or 470 Hz. This application will consider a hand coded loop holding off a memory for this time will and a requirement on frequency will need to be placed.

SRAM array 223 includes an additional bit per 32-bit word to hold a SEC flag that indicates whether the word was "corrected" when it was read. This flag marks words that need to be ReFlashed when a ReFlash Delta Timer (RDT) crosses 24 hours. This begins the process of capturing the contents of the target block. SRAM 223 captures the data at the beginning of the period for the target block so that RDT status can be saved to that block.

The RDT is maintained in non-volatile memory (PVMEM) so that power cycles will not destroy the running status. This running status can only be transparently written to the FLASH in the FLASH block that is currently being shadowed. Therefore each block will have an additional status space in PVTMEM and these spaces will be inspected on power on reset (POR) to determine the "most recent" and start the ReFlash state machine accordingly. Because this flag space is subject to the same disturb issues this must be handled as well likely by walking status across two PERASE blocks.

The following calculations determine the size of this storage. A system using HIB module 202 will have additional storage within HIB module 202 to keep track of information in high frequency power up/down systems.

Status is stored as delta minutes since last ReFlash per block. Enhanced FLASH macro 210 preferably has 4 blocks/macro and 2 macros. A 16-bit value is used since the target time is in days. A day has 1440 minutes, thus 16 bits can hold a time duration of about 45 days. This implies that 4 by 16-bit words of status are required per update. The FLASH endurance is assumed to be more than 15 K erase/write cycles. Each block keeps a separate RDT status because only the block having its contents shadowed contents in SRAM array 223 can be written.

The RDT update rate could be determined by how fast the shadow memory can fill on a block switch. This application will assume an update every 5 minutes. Assuming a 10 year life for enhanced FLASH macro 210, the number of updates is give by:

$$\frac{1440 \text{ minutes/day} \times 365 \text{ days/year} \times 10 \text{ years}}{5 \text{ minutes/update}} = 1,051,200 \text{ updates}$$

These updates are evenly distributed over 8 blocks of status so there are 131,400 updates per status block.

To keep a rolling status the RDT area needs two distinct row ERASE sections. If each section has 2 rows, then there are 64 words of status space and 16 status segments for each status segment. These memory locations will only see about 8000 endurance cycles. A practical embodiment will include a checksum with the RDT. This ensures that power removal during a write will not lead to an errant value. The previously written RDT would be used if that occurred.

A system that uses HIB module 202 to power cycle CPU 201 section of the chip will keep track of the RDT information because the resolution of the non-volatile RDT at 5 minute intervals is too large. A set of registers within HIB module 202 will be updated prior to entering HIB mode with an RDT having a 1/10 second resolution. Upon system start up following a power down cycle this information will be retrieved. This causes a lose of up to a maximum of 100 msec of uptime per HIB mode cycle event.

After reading the REGIB and before starting CPU 201, reFlash sub-system initializes its state by shadowing the currently selected block into the 32 Kbyte SRAM. This covers the condition where an E1 error has ERASED a page of FLASH and then power was removed before it was updated. If this happens, the initialization copies data from the scratch NVM and into the shadow SRAM before starting CPU 201. In this special case initialization will take about 2.5 msec. The normal initialization time is negligible. A special cased where a ReFlash of an E1 error in the REGIB is interrupted will be discussed below.

When a target FLASH block is up for processing, the contents of the block are captured. This uses reads on unused cycles to the target FLASH block. The integrity of the contents shadowed are evaluated to determine if there was an SEC and if so whether the error is type E0 or E1. SRAM 223 will have 34 bits per word to capture the data and a two bit status indicating the type of error.

Figure 3A:
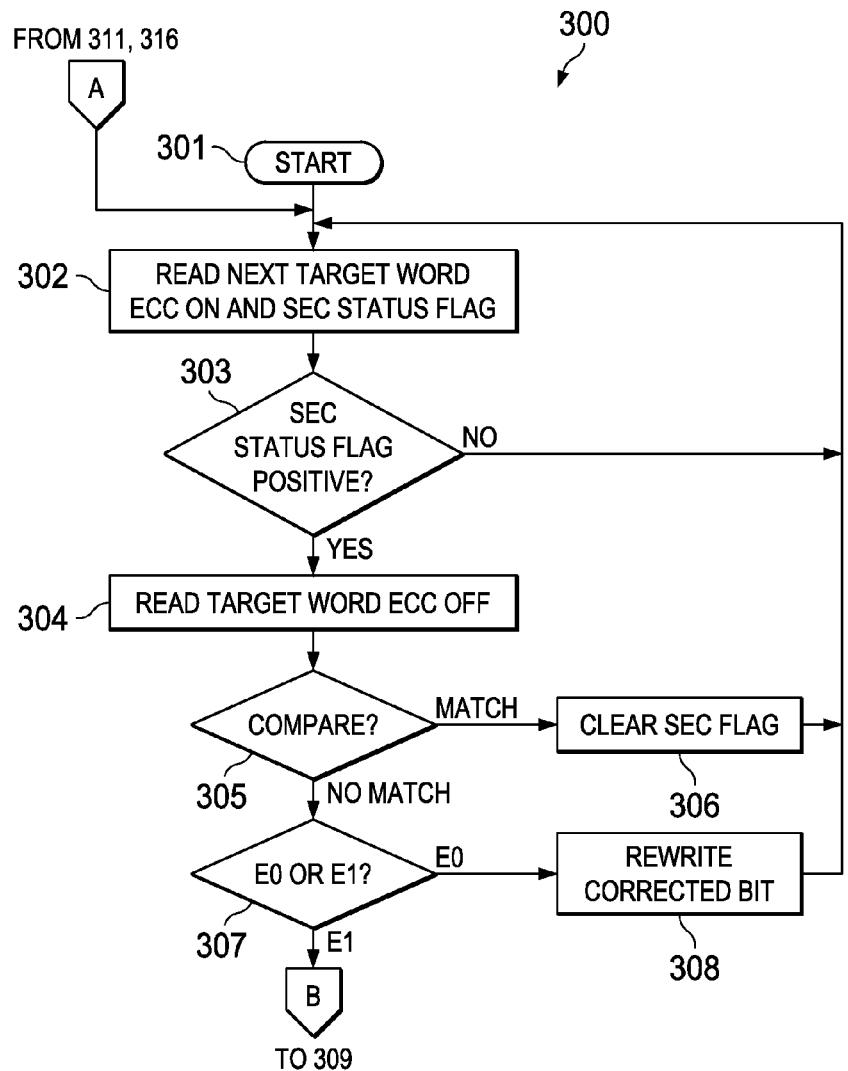
FIGS. 3A and 3B together illustrate the method of this invention.
Figure 3B:
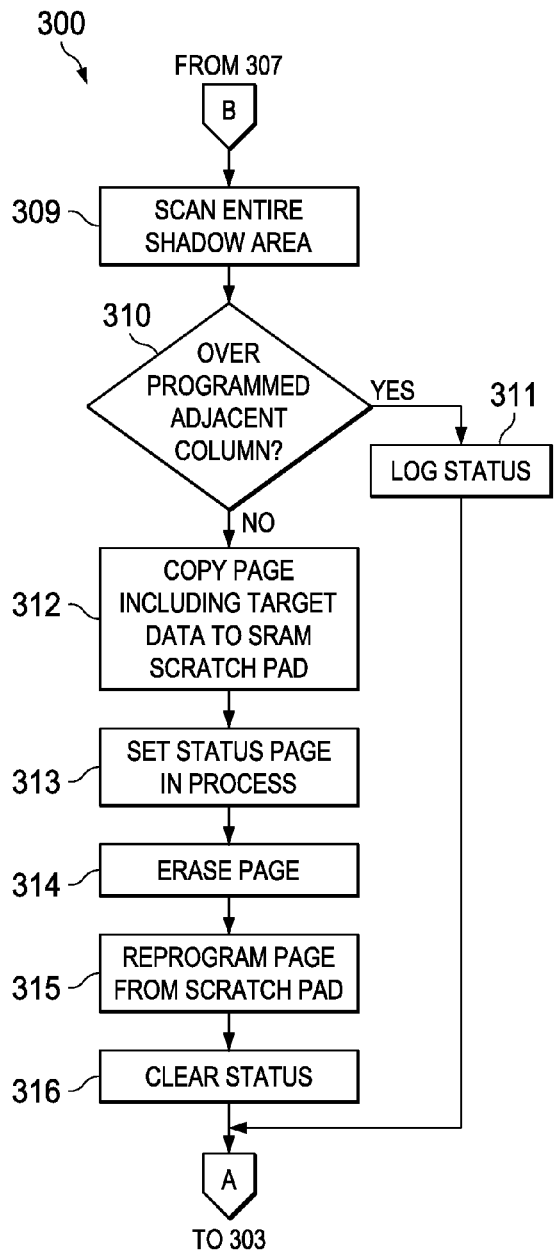

FIGS. 3A and 3B together illustrate process 300 of this invention. Process 300 begins with start block 301.

Block 302 reads the next target word and ECC bits with the error correction code ON (ECCON) capturing the word and SEC status flag.

Test block 303 determines whether the SEC flag is positive. As previously noted, a positive SEC flag indicates previous detection of a bit error in the target word. If the SEC flag is negative (No in test block 303), then process 300 returns to block 302 to read the next target word. In this case no error is detected and no remedial action is needed.

If the SEC has a positive SEC (Yes at test block 303), then block 304 reads the target word bits again with error correction code OFF (ECCOFF) to provide the raw FLASH cell values.

Test block 305 compares the ECCOFF data to the corrected word using the corresponding ECC bits. If there are no differences (Match at test block 305), then block 306 clears the SEC flag in the shadow memory. Process 300 returns to block 302 to read the next target word. In this case the reading and comparing continue. The failure noted by the SEC flag is intermittent in this case and this memory portion will not need to be ReFlashed until it also fails on an ECCOFF read (block 304).

If there is a difference (No Match at test block 305), then test block 307 finds the source of the difference and determines if it is an E0 type (0 to 1 error) or an E1 type (1 to 0 error). Test block 307 indicates this determination by setting the 34th bit of SRAM 223 to 1 if it is a E1 type error to cause different processing in the later fix. If this is an E0 type (E0 at test block 307), then block 308 writes the corrected bit into the target word. This write is preferably to the smallest data size that is independently writable in the particular FLASH memory. This limitation to this smallest data size may require appropriate use of write enable (WEN) strobes to limit the write operation. Properly configured this write operation will only change the state of the erroneous bit. Because no ERASE operation occurs, the FLASH is coherent even if the power is removed during the operation. If removing power can cause a WEN strobe to be errant, then the content is saved and a handshaking process is needed for recovery in case power is lost during this write operation. Process 300 continues in sequence to read the next data at block 302.

If this is an E1 type (E1 at test block 307), then block 309 scans the entire shadow memory area. Test block 310 determines if any of the E1 errors are due to over-programming an adjacent column. If this is the case (Yes at test block 310), then error correction by clearing the erroneous bit via a ReFlash will not help. Remedial action is beyond the scope of this invention. Block 311 logs this determination in a status register that can be examined by CPU 201 for the capture of long term statistics during characterization. Process 300 returns to read the next target data in block 302.

If the E1 error was not due to over programming adjacent columns (No at test block 310), then process 300 uses a different remediation technique than block 308 used for E0 errors. Once a block of FLASH has been shadowed and any errors determined, that block can be used for RDT statistics updates and ReFlash processing. Each PAGE (16 words) of words of SRAM 223 is examined sequentially. If there are errors, the PAGE is refreshed. It occurs in PAGES because a PROG/ERASE operation on the FLASH does the entire 16 word PAGE.

If the E1 error was not due to over programming adjacent columns (No at test block 310), then block 312 copies the smallest portion of memory that is independently erasable into SRAM 223. In this example this smallest independently erasable amount is a data page. Block 313 then sets a status to indicate PAGE in process identifying the particular PAGE involved. This enables data recovery if there is a power outage. There are 512 PAGES in a block and numbered 1 to 512 (PAGENUM) for the status so that 0 can be represent a completed operation. The status is a 32-bit word including ~PAGENUM and PAGENUM. This permits recovery of the last completed step following a power outage. Block 314 then erases the target PAGE. Block 315 reprograms the target PAGE with data from the scratch area of SRAM 223. Block 316 clears status to all 0's. Process 300 returns to block 302 to read the next target word.

The difference in remedial action based upon the nature of the bit error results from an asymmetry in FLASH memory. Bits are originally all 1's. The process of changing a bit from 1 to 0 is called writing and may be performed on an individual bit level depending on the FLASH architecture. The process of changing a bit from 0 to 1 is called erasing and generally can only be performed on blocks of data. Writing data is more complex and difficult than reading data, and erasing data is even more complex, often involving voltages applied to the memory much higher than reading or writing.

Since only cells with errors are targeted for ReFlash, the rest of the memory is not disturbed and the endurance cycles of the scratch/status area are kept to a minimum. This is critical since a significant increase in FLASH area to hold the scratch/status information would be unacceptable. The ECC processing with the ReFlash processing creates a dramatically better system for long term data retention than the ECC alone since soft errors get dynamically recharged.

Figure 4:
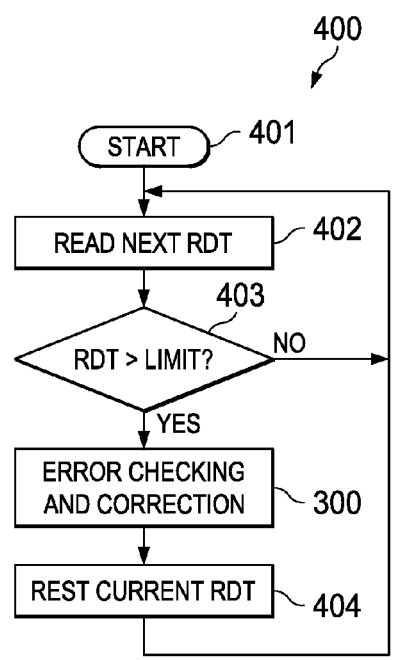
FIG. 4 is a flow chart illustrating the inventive method to periodically reFLASH data.

FIG. 4 illustrates method 400 to periodically reFLASH data within enhanced FLASH macro 210. Program 400 begins at start block 401. Block 402 reads the RDT data corresponding to a next portion of FLASH memory. For the first iteration this next portion of FLASH memory is the first portion. Text block 403 compares this RDT value with a predetermined time limit. As previously described this predetermined time limit is preferably 24 hours. If the RDT value is less than the predetermined time limit (No at test block 403), then no action is needed. Program 400 advances to block 402 to read the next RDT value.

If the RDT value is greater than the predetermined time limit (Yes at test block 403), then this portion of FLASH memory needs to be checked and corrected if necessary. This uses method 300 illustrated in FIG. 3. Following block 300 block 404 resets the corresponding RDT to zero. This prevents reFLASH of this memory block until the elapse of an additional predetermined time limit interval. Process 400 returns to block 402 to read the next RDT.

To summarize, this invention is a method to extend data retention for FLASH memory in a real time device embodied in generic semiconductor technology that re-energizes the FLASH memory array improving the retention characteristics of the memory without altering the clock cycle determinism of the system. Under certain conditions the Flash memory bit cells will lose their charge/non-charge over time. An ECC is used to correct single bit errors within a 32-bit word. The single error cases are identified and "ReFlashed" to bring the value of the cell back to its "newly" programmed levels to extend the time before a multiple error condition occurs within a word. This improves the long term retention characteristics of the memory at the expense of some control logic and an area of non-volatile scratch/status information.

Other embodiments of the present invention will be apparent to those skilled in the art after considering this disclosure or practicing the disclosed invention. The specification and examples above are exemplary only, with the true scope of the present invention being determined by the following claims.

What is claimed is:

1. A method of error correction in a FLASH memory comprising the steps of: periodically checking the FLASH memory to find single erroneous bits employing an error correction code stored with data; determining whether an erroneous bit is a bit that should be 0 read as a 1 or a bit that should be 1 read as 0; if said erroneous bit is a bit that should be 0 read as a 1, then writing correct data into the smallest data portion in the FLASH memory that can be independently written including the erroneous bit; and if said erroneous bit is a bit that should be 1 read as 0, then copying the smallest data portion in the FLASH memory that can be independently erased including the erroneous bit into a scratch memory, wherein the smallest data portion in the FLASH memory that can be independently erased differs from the smallest data portion in the FLASH memory that can be independently written, erasing the smallest data portion in the FLASH memory that can be independently erased including the erroneous bit, and writing correct data from the scratch memory into the smallest data portion in the FLASH memory that can be independently erased including the erroneous bit.

2. The method of claim 1 wherein:
said step of periodically checking the FLASH memory to find single erroneous bits includes
reading next target data and a corresponding error correction code and a corresponding single error corrections status flag;
correcting the target data corresponding to the error correction code; and
if the single error corrections status flag indicates an error
reading the target data again without correction corresponding to the error correction code,
comparing the corrected target data and the target data without correction,
if the corrected target data and the target data without correction match, setting the single error corrections status flag to indicate no error, and
if the corrected target data and the target data without correction do not match, finding the single erroneous bit.

3. The method of claim 1, wherein:
said step of if said erroneous bit is a bit that should be 0 read as a 1, then writing correct data into the data portion in the FLASH memory includes saving the correct data into non-volatile memory before writing correct data into the data portion in the FLASH memory.

4. The method of claim 3, wherein:
upon power removal during said writing correct data into the data portion in the FLASH memory, writing the correct data recalled from the non-volatile memory upon recovery of power.

5. The method of claim 1, wherein:
said steps if said erroneous bit is a bit that should be 1 read as 0 further includes
  setting a page in process indication in non-volatile memory before copying the data portion into a scratch memory, and
  resetting the page in process indication following writing correct data.

6. The method of claim 5, wherein:
upon each initial application of power, said method checking the page in process indication:
if the page in process indication indicates a page in process, then
  copying the smallest data portion in the FLASH memory that can be independently erased including the erroneous bit into a scratch memory,
  erasing the smallest data portion in the FLASH memory that can be independently erased including the erroneous bit, and
  writing correct data from the scratch memory into the smallest data portion in the FLASH memory that can be independently erased including the erroneous bit.

7. A real time computational system comprising: a central processing unit; a system bus connected said central processing unit; a FLASH memory macro connected to said system bus including plural portions of FLASH memory; a hibernate module connected to said system controlling application of power to said central processing unit and said FLASH memory macro; and a reFLASH sub-system connected to said system bus and said FLASH memory macro, said reFLASH sub-system operable to periodically check said FLASH memory macro to find single erroneous bits employing an error correction code stored with data; determine whether an erroneous bit is a bit that should be 0 read as a 1 or a bit that should be 1 read as 0; if said erroneous bit is a bit that should be 0 read as a 1, then write correct data into the smallest data portion in the FLASH memory that can be independently written including the erroneous bit; and if said erroneous bit is a bit that should be 1 read as 0; then copy the smallest data portion in the FLASH memory that can be independently erased including the erroneous bit into a scratch memory, wherein the smallest data portion in the FLASH memory that can be independently erased differs from the smallest data portion in the FLASH memory that can be independently written, erase the smallest data portion in the FLASH memory that can be independently erased including the erroneous bit, and write correct data from the scratch memory into the smallest data portion in the FLASH memory that can be independently erased including the erroneous bit.

8. The real time system of claim 7, wherein:
said reFLASH sub-system is operation to periodically checking the FLASH memory to find single erroneous bits
  reading next target data and a corresponding error correction code and a corresponding single error corrections status flag;
  correcting the target data corresponding to the error correction code; and
  if the single error corrections status flag indicates an error
    reading the target data again without correction corresponding to the error correction code,
    comparing the corrected target data and the target data without correction,
    if the corrected target data and the target data without correction match, setting the single error corrections status flag to indicate no error, and
    if the corrected target data and the target data without correction do not match, finding the single erroneous bit.

9. The real time system of claim 7, wherein:
said reFLASH sub-system is operable if said erroneous bit is a bit that should be 0 read as a 1, then writing correct data into the data portion in the FLASH memory includes saving the correct data into non-volatile memory before writing correct data into the data portion in the FLASH memory.

10. The real time system of claim 9, wherein:
said reFLASH sub-system is further operable upon power removal during said writing correct data into the data portion, writing the correct data recalled from the non-volatile memory into the data portion of the FLASH memory upon recovery of power.

11. The real time system of claim 7, wherein:
said reFLASH sub-system is operable if said erroneous bit is a bit that should be 1 read as 0 further including
  setting a page in process indication in non-volatile memory before copying the data portion into a scratch memory, and
  resetting the page in process indication following writing correct data.

12. The real time system of claim 11, wherein:
said reFLASH sub-system is further operable upon each initial application of power to check the page in process indication:
if the page in process indication indicates a page in process, then
  copying the smallest data portion in the FLASH memory that can be independently erased including the erroneous bit into a scratch memory,
  erasing the smallest data portion in the FLASH memory that can be independently erased including the erroneous bit, and
  writing correct data from the scratch memory into the smallest data portion in the FLASH memory that can be independently erased including the erroneous bit.

* * * * *